(12) United States Patent
Weber, Jr.

(10) Patent No.: US 10,800,377 B1
(45) Date of Patent: Oct. 13, 2020

(54) VEHICLE SECURITY SYSTEM

(71) Applicant: WebRam LLC, Houston, TX (US)

(72) Inventor: Randall Keith Weber, Jr., Houston, TX (US)

(73) Assignee: WEBRAM LLC., Houston, TX (US)

( * ) Notice: Subject to any disclaimer, the term of this patent is extended or adjusted under 35 U.S.C. 154(b) by 0 days.

(21) Appl. No.: 16/799,674

(22) Filed: Feb. 24, 2020

(51) Int. Cl.
*B60R 25/10* (2013.01)
*B60K 15/04* (2006.01)

(52) U.S. Cl.
CPC ...... *B60R 25/1012* (2013.01); *B60K 15/0406* (2013.01); *B60R 25/1001* (2013.01)

(58) Field of Classification Search
CPC ............ B60R 25/1012; B60R 25/1001; B60K 15/0406
USPC ...................................................... 340/426.1
See application file for complete search history.

(56) References Cited

U.S. PATENT DOCUMENTS

| | | | |
|---|---|---|---|
| 5,387,897 A * | 2/1995 | Bechtle | B60R 25/1001 307/10.2 |
| 7,714,696 B2 * | 5/2010 | Rumpf | B60R 25/042 180/287 |
| 8,436,721 B1 * | 5/2013 | Lee | B60R 25/24 180/173 |
| 9,169,115 B2 * | 10/2015 | Stefan | B67D 7/065 |

* cited by examiner

*Primary Examiner* — John A Tweel, Jr.
(74) *Attorney, Agent, or Firm* — Nolte Intellectual Property Law Group (57) ABSTRACT

A vehicle security system may be automatically activated when a vehicle (e.g., car or truck) is temporarily stopped. Specifically, if a car is stopped at a gas station or other type of temporary stop (e.g., where a car would not be fully closed and locked) the vehicle security system may engage (e.g., based on opening of a gas cap cover). The vehicle security system monitors for theft of contents from inside a vehicle in a temporary stopped state. Sensors monitor if a passerby reaches into an open (or partially open) window to grab a parcel, handbag, phone, etc. from inside the vehicle. In a temporary stop condition, a vehicle may not be fully locked to engage a standard anti-theft security system. If a driver's attention is diverted away from the vehicle during the temporary stopped condition a quick and quiet theft scenario (e.g., a reach and grab) may be attempted.

20 Claims, 11 Drawing Sheets

VEHICLE SECURITY SYSTEM

BACKGROUND

Vehicle security systems are to prevent theft of a vehicle and, in some cases, security systems prevent break-in to a vehicle by a thief intent on stealing contents (e.g., personal belongings) of the protected vehicle. In prior art systems, a vehicle security system is engaged when the vehicle is to be left unattended for a period of time. In most cases, a vehicle security system will engage as part of a "locking and securing" of the vehicle. That is, a driver leaving a vehicle will close all windows and doors and then engage door locking mechanisms to activate a security system prior to departing from the general area of where the vehicle is parked.

When a vehicle is performing a refueling operation, the usual process includes: pulling the vehicle into a gas station; positioning the vehicle with a side of the vehicle having a gas tank lid next to a gas pump; exiting the vehicle; interacting with the gas pump (e.g., to pay or select fuel grade); inserting a gas pump nozzle; waiting for the gas to be dispensed; interacting with the gas pump (e.g., completing transaction); and re-entering the vehicle. During these activities it may be possible for a driver (or other person performing refueling operation) to have moments of inattentiveness toward their overall surroundings. Specifically, the person performing the refueling may have a "blind side" with respect to their own vehicle. The blind side represents a side of the vehicle opposite the gas tank lid on a far side from the position of the driver while refueling. The blind side, as the name implies, may have an obstructed view.

One specific type of crime is referred to as "sliding." The crime of sliding involves a stranger approaching the blind side of the vehicle where the driver may not have full visibility. The thief then enters or reaches into the vehicle (e.g., a "reach and grab" through an open window) and quickly grabs personal items (e.g., cell phone, parcel, purse) from the vehicle. After the thief has obtained an item, they quickly and quietly return to their vehicle (which in some cases has been pulled alongside the target vehicle) and exit the area. Due to its quick nature, a sliding style theft is difficult to prevent or prosecute. Disclosed implementations of a vehicle security system include automatically activated features and premises detection/monitoring techniques to provide detection of a sliding or attempted sliding type crimes (e.g., different types of reach and grab crimes).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference be made below to the accompanying drawings, in which.

DETAILED DESCRIPTION

Illustrative examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The disclosed vehicle security system may be beneficial under a number of different conditions that are typically not protected by traditional vehicle security systems (e.g., sliding style thefts). For example, the disclosed vehicle security system may automatically engage (activate) when stopped for gas, stopped at the beach, stopped on a city street at a stoplight, or generally stopped anywhere foot traffic would allow a thief to approach a vehicle that is not fully closed and locked.

In one example, a sensor to detect a gas tank opening operation may be configured to automatically activate vehicle security system when filling the tank. In this situation, the vehicle security system may perform actions specifically designed to address a sliding theft. In one example, operations such as window closure and door locking may be implemented for the blind side of the vehicle and leave the windows and doors on the same side of the car as the gas tank opening unaffected. In another example, these security operations may be performed for the entire vehicle. Each of these operations and the other operations disclosed herein may be controlled by "user preferences" or configuration settings of the disclosed vehicle security system.

As part of a refueling operation, the gas tank opening operation may include: removal of a gas cap; opening of a gas tank lid; insertion of a nozzle; movement of an internal flap of the gas tank opening; activation of a gas tank lid unlock button; and generally any operation that indicates a refueling operation is initiated. The side of the car opposite the gas tank fill side (i.e., blind side) may be more vulnerable than the side where the gas fueling process is taking place. The automatic activation may be initiated by a first operation (e.g., initiate refueling) and an automatic de-activation may be performed by a second operation (e.g., terminate refueling). Termination of refueling may be detected in a number of ways (e.g., driver returning to vehicle; removal of nozzle; closing of gas tank lid).

To prevent false positives (e.g., alarm sensor activations) of the disclosed vehicle security system, if a person (or pet) is in the vehicle (referred to herein as occupied) the disclosed system could be in communication with airbag sensors inside seats to determine a weight threshold that indicates seat is occupied. Alternatively, or in addition to that capability, a motion sensor inside the vehicle may determine if occupants are inside the vehicle. In some cases, image processing (such as face recognition) may be implemented for images from an interior camera of the vehicle to help determine an occupancy status. This concept is further explained below with reference to FIG. 2B.

In a specific example, sensors could be motion detectors to detect an object passing through an open window such as a thief reaching into the vehicle interior to grab a parcel or other personal belonging. Sensors may be configured to detect an unexpected door opening while in a stop condition. Specifically, if a vehicle were in a stop condition and the driver was fueling the vehicle, a stranger approaching and opening a door on an opposite side of the car from the gas tank opening would likely result in an alarm condition (also called an alert condition). If an alarm condition is detected, the disclosed vehicle security system may send a message to, or interface with an application executing on, a driver's cell phone to provide a notification to the driver.

As briefly mentioned above, and discussed further below, proximity sensors of the vehicle equipped with the disclosed vehicle security system may monitor activity (e.g., motion and proximity of people) around a vehicle to determine if an alert is desired. Sensors may also interface with internal video recording devices to capture video evidence if an incident does take place. That video may provide evidence at a court proceeding or provide other uses. In some implementations, the disclosed vehicle security system may automatically activate based on vehicle speed being below a certain threshold and the vehicle compartment not being enclosed (e.g., a window is open, or a door is ajar).

In addition to the fuel door open state activating the disclosed vehicle security system, an activation may be initiated prior to actually opening the gas lid. For example, the disclosed vehicle security system may activate when a fuel door unlock button is pressed prior to the driver exiting the vehicle. In some implementations, activation may automatically close windows on a pre-defined blind side (side opposite gas tank lid) and/or lock doors until fuel door is closed. Once a completion of fueling is detected, the disclosed vehicle security system may automatically return windows and doors (and any other automatically changed options) to their original state (i.e., immediately prior to activation). In some cases, returning to an original state may be delayed (e.g., by a configurable timer) to allow time for a person performing the fueling operation to get back into the vehicle. The disclosed vehicle security system may be configured with processing capability to determine if a passenger of the car, rather than the driver, is performing the fueling operation and adjust automatically.

In some cases, if windows are open after alarm system activation, or there is unexpected motion within the vehicle, an audible or visual alert may be provided by the vehicle (e.g., lights flash, horn beeps). This action may be instead of or in addition to a cell phone interface. User preferences may provide thresholds and represent configuration parameters to alter default behavior of the disclosed vehicle security system. In this manner, a vehicle owner may configure the types of events and alert actions that take place once an alarm/alert condition is initiated.

In another example, if unexpected motion occurs during a fueling operation or other stop condition, and windows are not already closed, the disclosed system may automatically initiate preemptive action (e.g., close windows, flash lights, beep horn) to deter a possible threat. Exterior motion sensors may be mounted on an exterior surface of the vehicle and may be included within or installed on a side mirror or door handle. In general, motion sensors may be installed at a location so as to not impede functioning of the vehicle (e.g., create wind noise, cause visibility issues) and may leverage locations that already protrude from the vehicle body to provide an enhanced "viewing" angle for proximity detection.

Sensors internal to a car may work in conjunction with external motion sensors to determine if the plane of an open window is broken. Specifically, the combination of sensors may be configured to detect if someone is reaching into the vehicle from the outside while the vehicle is in a stop condition. Detection of an occupant reaching out of the vehicle may be suppressed by tracking movements of occupants during the stop condition. In this manner, false positives (e.g., unnecessary activations) for the vehicle security system may be reduced or eliminated. Sensors may be placed at different points around the perimeter of the plane formed by the closed window to support this capability.

Having the above overview, we turn to the FIGs. to provide more detail and explain some example operational environments where the disclosed vehicle security system may be beneficial. Other types of situations are also possible and within the scope of this disclosure.

Figure 1A:
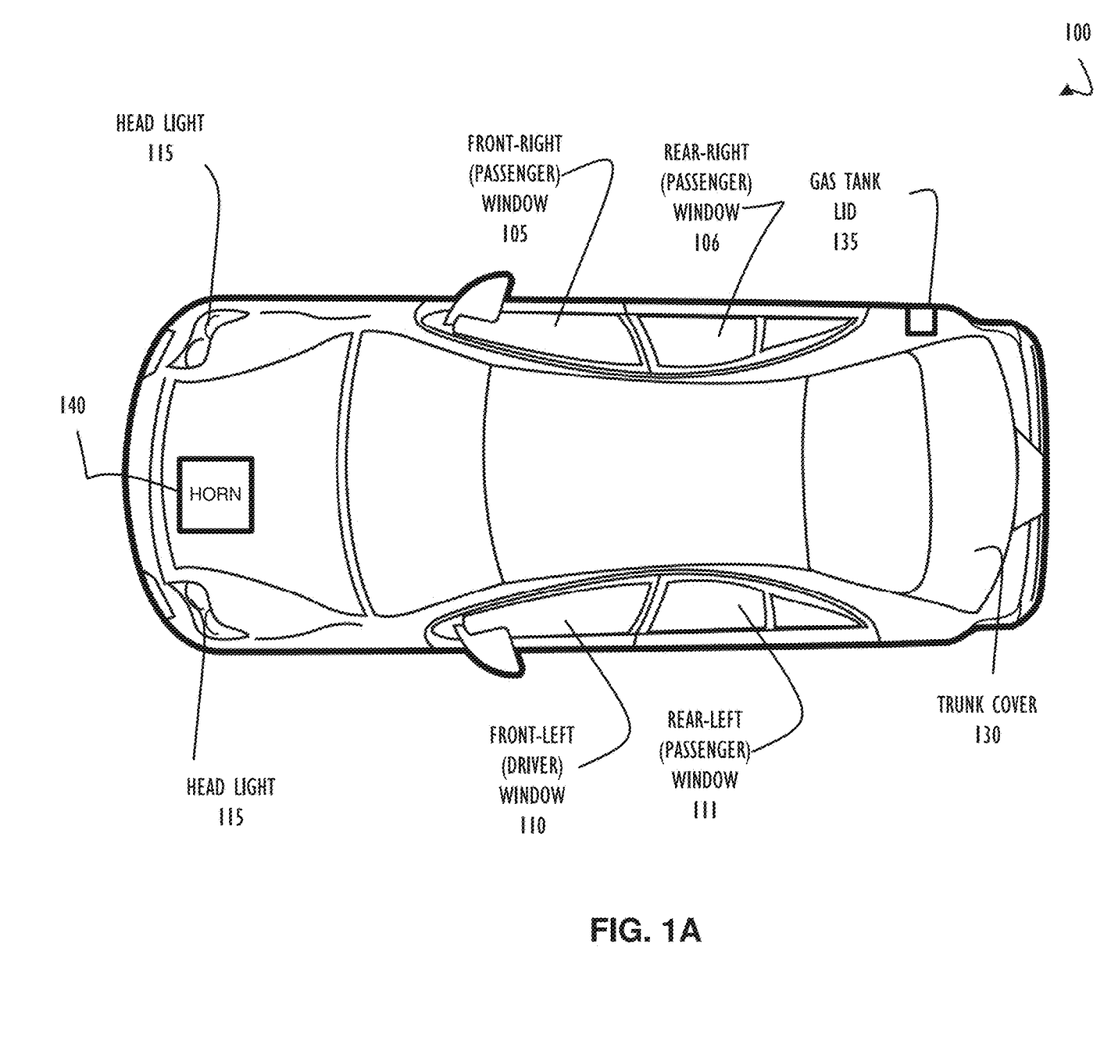
FIGS. 1A-B illustrate different perspective views of a vehicle in which a vehicle security system may be implemented, according to one or more disclosed implementations.
Figure 1B:
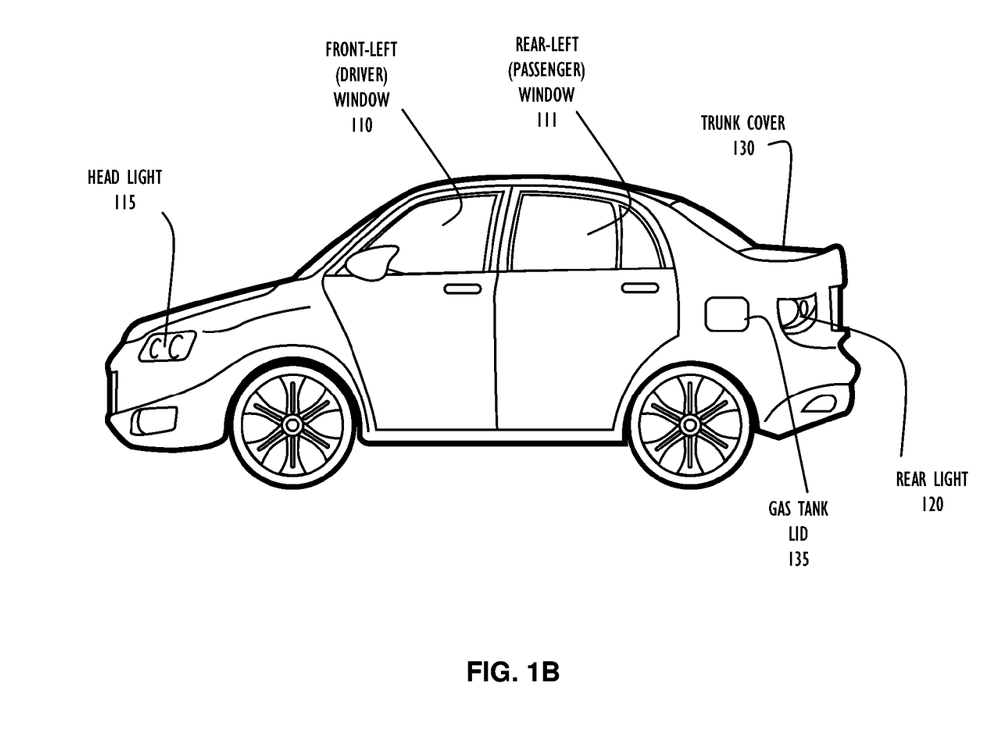

FIG. 1A illustrates a top perspective view of a vehicle 100 (in this case an automobile) that may have installed a vehicle security system in accordance with this disclosure. FIG. 1B illustrates a left side perspective of vehicle 100. Although examples used herein reflect an automobile, other types of vehicles (e.g., trucks, commercial vehicles) may benefit from the disclosed vehicle security system. Accordingly, disclosed techniques are not limited to any particular type of vehicle. Further, elements illustrated for vehicle 100 are for example purposes only. Other automobiles and other types of vehicles may include additional (or fewer) elements and still benefit from disclosed techniques and systems.

As illustrated in FIG. 1A, vehicle 100 includes a front-right (passenger) window 105, a rear-right (passenger) window 106, a front-left (driver) window 110, and a rear-left (passenger) window 111. This configuration conforms to that of a left drive vehicle as would be used in the United States, for example, and a right drive vehicle as would be used in Great Britain would have similar but differently positioned elements. Vehicle 100 also includes a pair of headlights 115 and rear light(s) 120 (shown in FIG. 1B). Vehicle 100 further includes a trunk cover 130, a gas tank lid 135, and a horn 140. Each of these elements are well understood for standard function and use so further explanation is not provided here. As disclosed further below, additional functionality (beyond the standard functionality) of each of these elements may be provided as part of the disclosed vehicle security system.

Figure 2A:
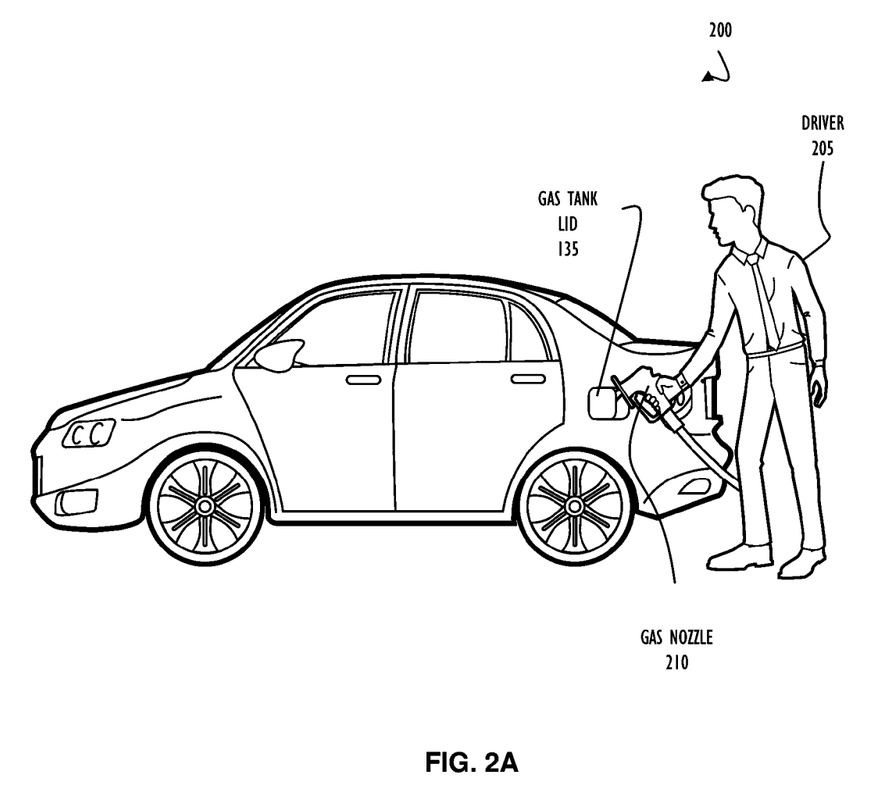
FIGS. 2A-B illustrate different examples of a driver providing fuel (e.g., gasoline or diesel) to a vehicle, according to one or more disclosed implementations.

FIG. 2A illustrates fueling activity 200 where a driver 205 may open gas tank lid 135 to provide fuel (e.g., gasoline or diesel) to vehicle 100. As illustrated, this operation may be performed by inserting gas nozzle 210 into a gas tank opening (not shown) that is under gas tank lid 135 for vehicle 100. In FIG. 2A, fueling activity 200 is performed for an empty vehicle (i.e., vehicle with no pets or other passengers).

Figure 2B:
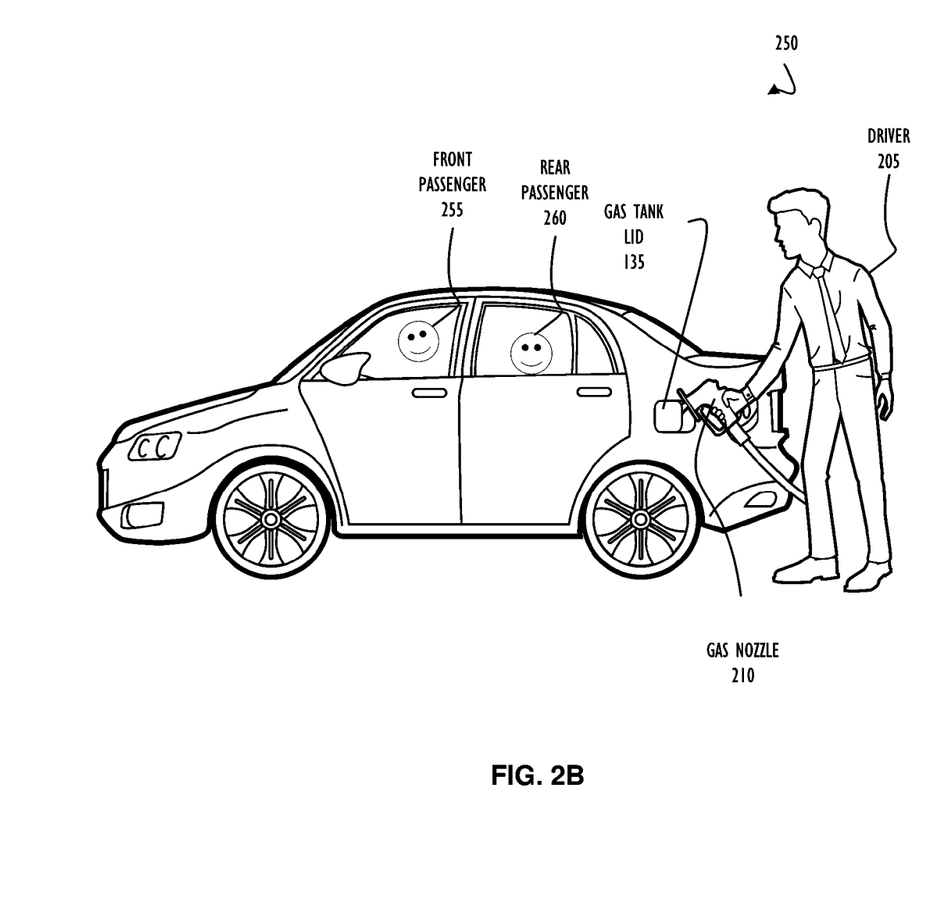

FIG. 2B illustrates fueling activity 250 that is similar to fueling activity 200 except there has been added a front passenger 255 and a rear passenger 260. Thus, vehicle 100 in fueling activity 250 will experience different internal activity than the same vehicle 100 while fueling. Accordingly, as explained further below, the disclosed vehicle security system may provide different functionality based on detection of an occupied versus an unoccupied vehicle 100. As illustrated in FIGS. 2A-B a vehicle may have multiple windows that may each be in an open state or a closed state. Disclosed implementations of a vehicle security system may perform actions differently with respect to window state (or amount that a window is open). Specifically, if a window is "cracked" such that it is only open an inch or two (i.e., not enough for a hand/arm to reach through) then security monitoring may be reduced as opposed to a more fully open window (i.e., susceptible to a reach in threat). In some cases, the disclosed vehicle security system may automatically attempt to alter a window state. That is, under certain conditions the vehicle security system may attempt to close an open window automatically (i.e., without additional user action).

In some cases, the disclosed vehicle security system may try to determine a type of individual that is an occupant of the vehicle. For example, the system may detect that a child is occupying a seat as opposed to an adult. In another example, the system may detect that a pet is inside the vehicle. Occupant type detection may utilize several factors including, but not limited to, weight, height, image processing software, amount of movement, and number of pressure points (e.g., a person's bottom versus four paws of a pet) to make a determination. Based on the occupant type, the disclosed vehicle security system may process detected events differently. For example, a dog or child may be more apt to reach out an open window than an adult so thresholds to alert for such action may be increased (e.g., less likely to alert). This is just one example, other types of alteration based on occupant type detection may also be implemented.

Figure 3:
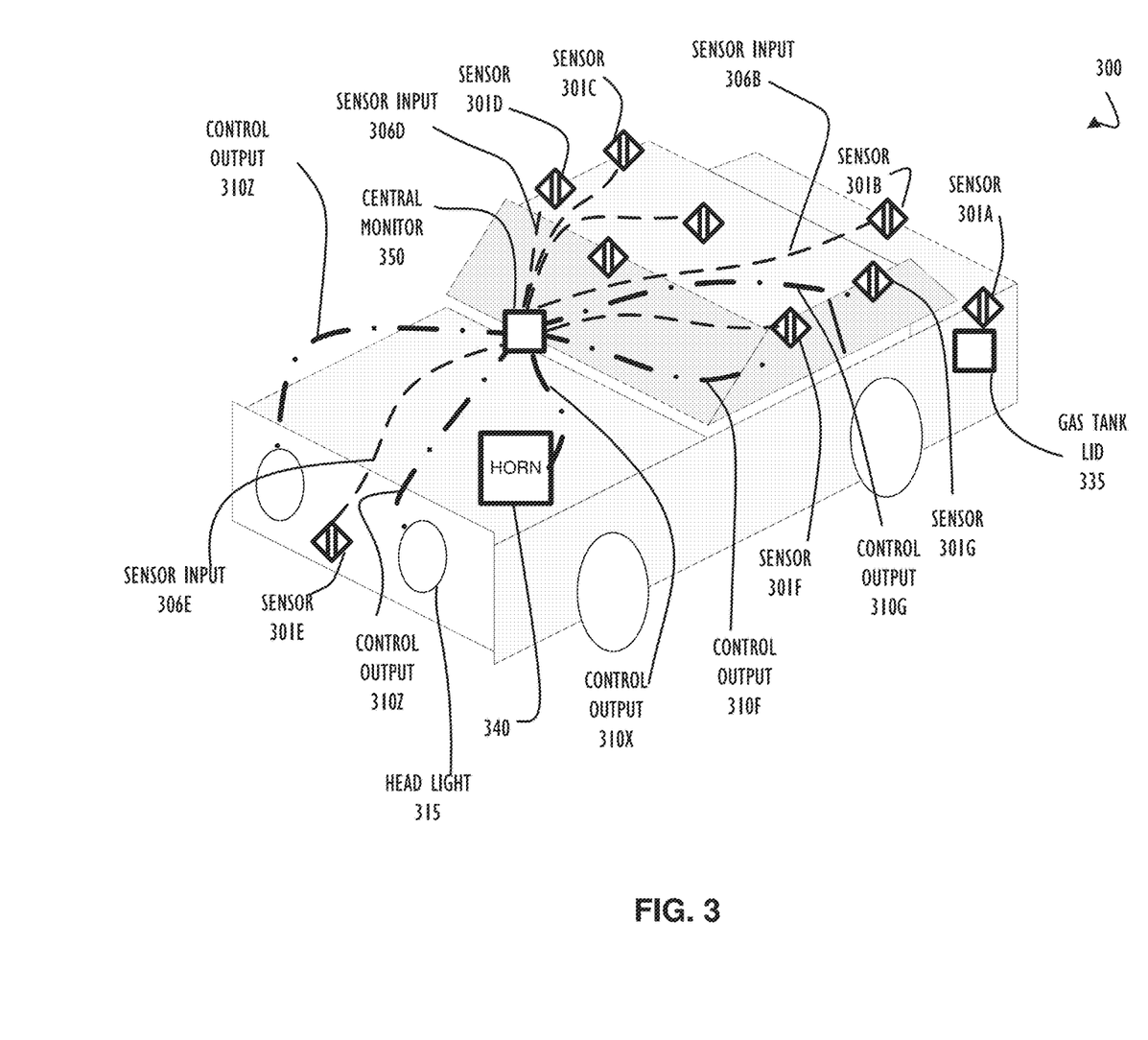
FIG. 3 illustrates a schematic of example components of a vehicle security system, according to one or more disclosed implementations.

Referring now to FIG. 3, a schematic 300 of example components, used collectively, to implement a vehicle security system are illustrated, according to one or more disclosed implementations. Schematic 300 is illustrated as an overlay on a vehicle template that represents a vehicle similar to vehicle 100 of FIG. 1. Schematic 300 includes a central monitor 350 that may be an example of a central control processor as discussed herein. As explained herein, a central control processor may receive multiple inputs from different locations within a vehicle and detect environmental activity (e.g., activity within the area surrounding) associated with the vehicle. These inputs and monitoring may be provided by one or more sensors as discussed throughout this disclosure (e.g., See, FIG. 6).

In schematic 300, central monitor 350 is connected to sensors (301A-G) via sensor inputs (e.g., 306B, 306D, and 306E). In schematic 300, for clarity of the figure, not all sensors are labeled with a specific reference number and more (or less) sensors may be included in an implementation than specifically shown in this example. In general, each sensor is connected via a sensor input (illustrated as a dashed line) to central monitor 350 and for clarity of presentation only a subset of these connections is illustrated and labeled in FIG. 3. Sensor inputs may be wired or wireless and may be unidirectional or bidirectional between a given sensor and central monitor 350.

Also shown in schematic 300 control outputs (310X and 310Z) are illustrated (as a bold dash-dot line) in accordance with some implementations. In general control output 310X provides a connection between central monitor 350 and horn 340. This connection may be used so that control processor may cause horn 340 to beep or make an audible sound. Depending on a type of alert, central monitor 350 may cause horn 340 to provide a short beep, long beep, loud beep, alternate a beeping pattern, or the like. In any case, the type of audible signal may be coordinated to conform to a threat level associated with event processing at central monitor 350. In one example, a soft short beep may be provided to indicate a system is automatically arming itself or that window state may be automatically altered (e.g., after a short delay from warning alert). In a more severe example, for instance detection of an immediate theft threat, a long loud or quickly repetitive beep pattern may be initiated by central monitory 350 using horn 340. In some implementations, additional audible outputs (e.g., extra speakers, audio speakers, siren) that are not specifically illustrated in schematic 300 may interface with central monitor 350.

As also illustrated in schematic 300, control outputs 310Z connect central monitor 350 to headlights 315 (see headlights 115 of FIG. 1). Although not specifically shown in schematic 300, control outputs may also provide a similar connection to other vehicle lights (dome light, rear light, etc.). As with control of horn 340 above, control outputs 310Z may be used to cause head lights 315 to flash or provide visual alert signals of different types (e.g., flash low to high beams). In the case of control outputs for horn 340 and headlights 315 there is no associated sensor input because, in this example, the horn and lights are used as outputs only (input/output pairs are discussed next).

In schematic 300 some control outputs are specifically associated with a sensor (e.g., an input/output pair). For example, sensor 301G is associated with sensor control 310G. This sensor 301G and sensor control 310G are further associated with a rear-left (passenger) window such as rear-left (passenger) window 111 of FIG. 1. To be clear, this type of association indicates that sensor 301G may be used to determine a state (e.g., open, closed, or partially open) of the window and report that state via a sensor input (not shown in FIG. 3) to central monitor 350. Based on the state information and other processing, central monitor 350 may automatically cause the window to change state (e.g., close or open) based on a signal via associated control output 310G. This type of three-way (sensor, monitor, control) association may be used for other components of a vehicle than a window.

Also included in schematic 300, sensor 301B may be a trunk lid and/or rear proximity sensor, sensor 301A may be a gas tank lid 335 sensor to detect state of the gas tank lid 335 (see gas tank lid 135 of FIG. 1), sensor 301E may be a front proximity sensor, sensors 301C, 301D, 301F, and 301G are illustrated as respective window sensors. Sensors may be placed in such position as to monitor interior space of a vehicle and may be connected to air-bag sensors of seats to determine if weight is present on a given seat area (e.g., for occupant detection). Sensors may monitor both the interior and exterior of a vehicle and determine if a proximity external to the vehicle has been entered by a previously undetected person. Specifically, the system may have determined a position of the driver based on the driver exiting the vehicle and opening gas tank lid 335. Thus, activity in a different area may be automatically attributed to a "stranger" as the driver is not in that area. In general, a proximity around a vehicle may be monitored and tracked to determine appropriate levels of concern (e.g., threat level) for the disclosed vehicle security system.

In some cases, a change in state of gas tank lid 335 may provide an input to arm or disarm the disclosed vehicle security system. Specifically, a system such as the disclosed vehicle security system may be configured to be only operational while gas tank lid 335 is in an open state. Accordingly, opening of gas tank lid 335 would arm the system and closing of gas tank lid 335 would disarm the system. This type of implementation may be practical for a driver that generally does not open their windows or is concerned only with enhanced theft protection while refueling. Drivers that often ride with open windows or in areas of high pedestrian traffic may prefer other configurations than the gas tank lid example provided here.

Figure 4:
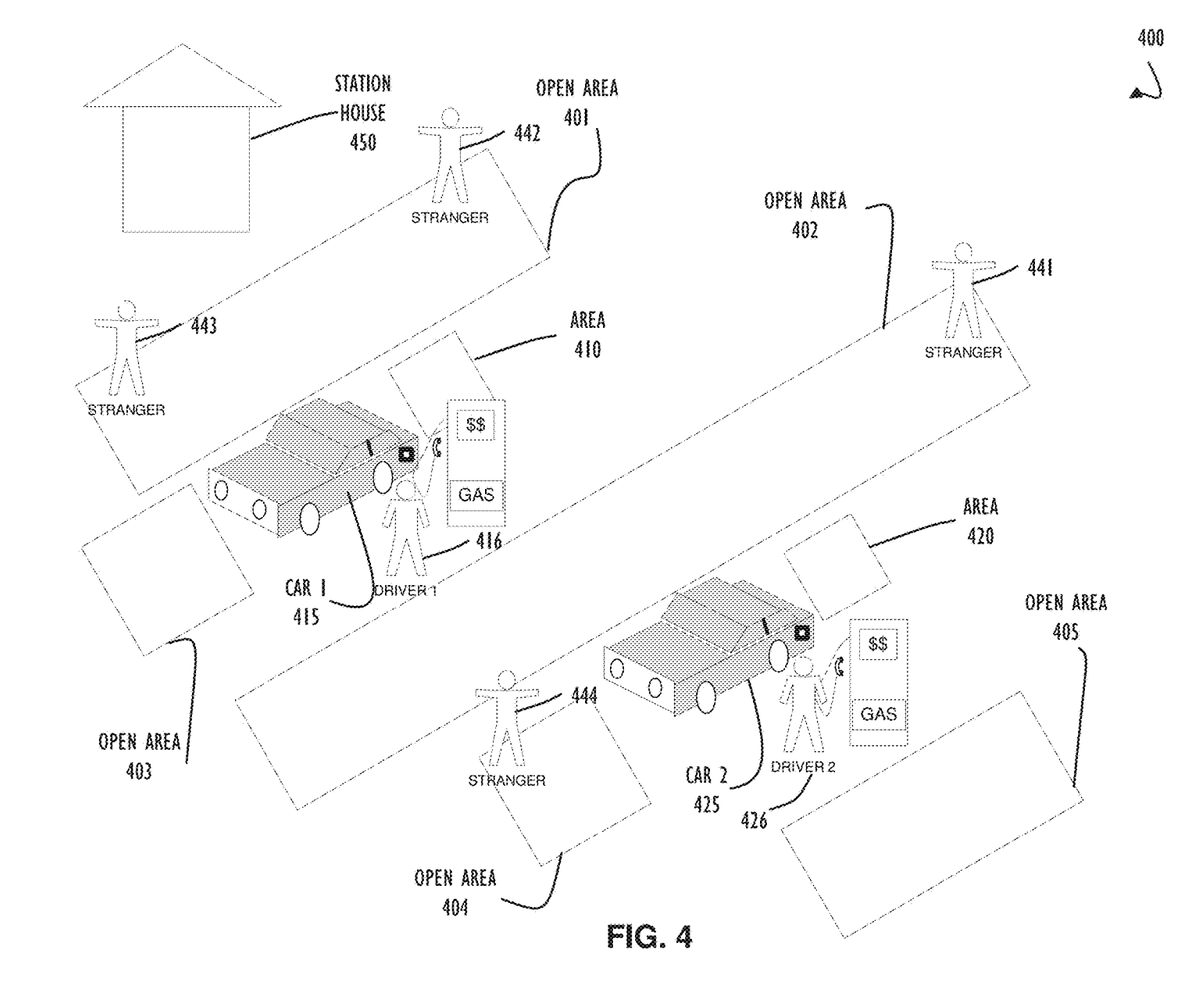
FIG. 4 illustrates a first example environment (e.g., a fueling station), of many different possible environments, where the disclosed vehicle security system may be beneficial, according to one or more disclosed implementations.

Referring now to FIG. 4 a first example environment 400 of multiple vehicles at a fueling station is shown. In this example, one or more of the vehicles illustrated may be considered vehicle 100 discussed above that may include a vehicle security system in accordance with this disclosure. A fueling station typically includes a station house 450 that may include an area to interact with a gas station attendant to purchase snacks or pay for fuel. Additionally, station house 450 may include a restroom (not shown) or other area that may be visited by a person purchasing fuel. Accordingly, that person may leave their vehicle temporarily unattended and may decline or forget to fully secure their vehicle. In some cases, a driver may leave a vehicle that has other occupants not anticipating that the other occupants may also depart from the area of the vehicle. In any case, while at a gas station a vehicle may become temporarily unattended. Further, while fueling, a person may be inattentive to their surroundings because they are focused on fueling or for some other reason.

Example environment 400 includes several different areas that are illustrated in varying degrees of proximity to each vehicle. Specifically, a first car 415 is illustrated next to open area 401 on the opposite side of the vehicle with respect to a first driver 416, behind open area 403, and next to open area 402. A second car 425 is illustrated next to open area 402 (opposite the second driver 426), behind open area 404, and next to open area 405. Multiple strangers are illustrated in environment 400 at different locations. Note that, with respect to first driver 416, second driver 426 may be considered a stranger and vice versa. Specifically, stranger 441 is illustrated in open area 402, stranger 442 is illustrated in open area 401, stranger 443 is also illustrated at a different position within open area 401 (more proximate to first car 415), and stranger 444 is illustrated in open area 404 directly in front of second car 425. Each of the strangers listed present a potential threat in the way of theft of personal belongings (or the car itself—carjacking). As discussed herein, the disclosed vehicle security system may monitor an internal environment of an equipped vehicle as well as monitor a surrounding area (proximity) of the vehicle. Monitoring actions may be intended to prevent a reach into an open window or other action by a stranger to impact the safety of or personal belongings of a person obtaining fuel.

The disclosed vehicle security system may be configured to more closely monitor areas more proximate to a vehicle than areas more distant to that vehicle. For example, in environment 400, a vehicle security system of first car 415 may more closely monitor movement and activity of stranger 443 than that of stranger 441. As illustrated, stranger 441 represents a less degree of threat to first car 415 than does stranger 443. However, as movement of people in the environment changes, so too may the degree of threat. Accordingly, the disclosed vehicle security system may alter its monitoring priorities in real-time (or near real-time).

Figure 5:
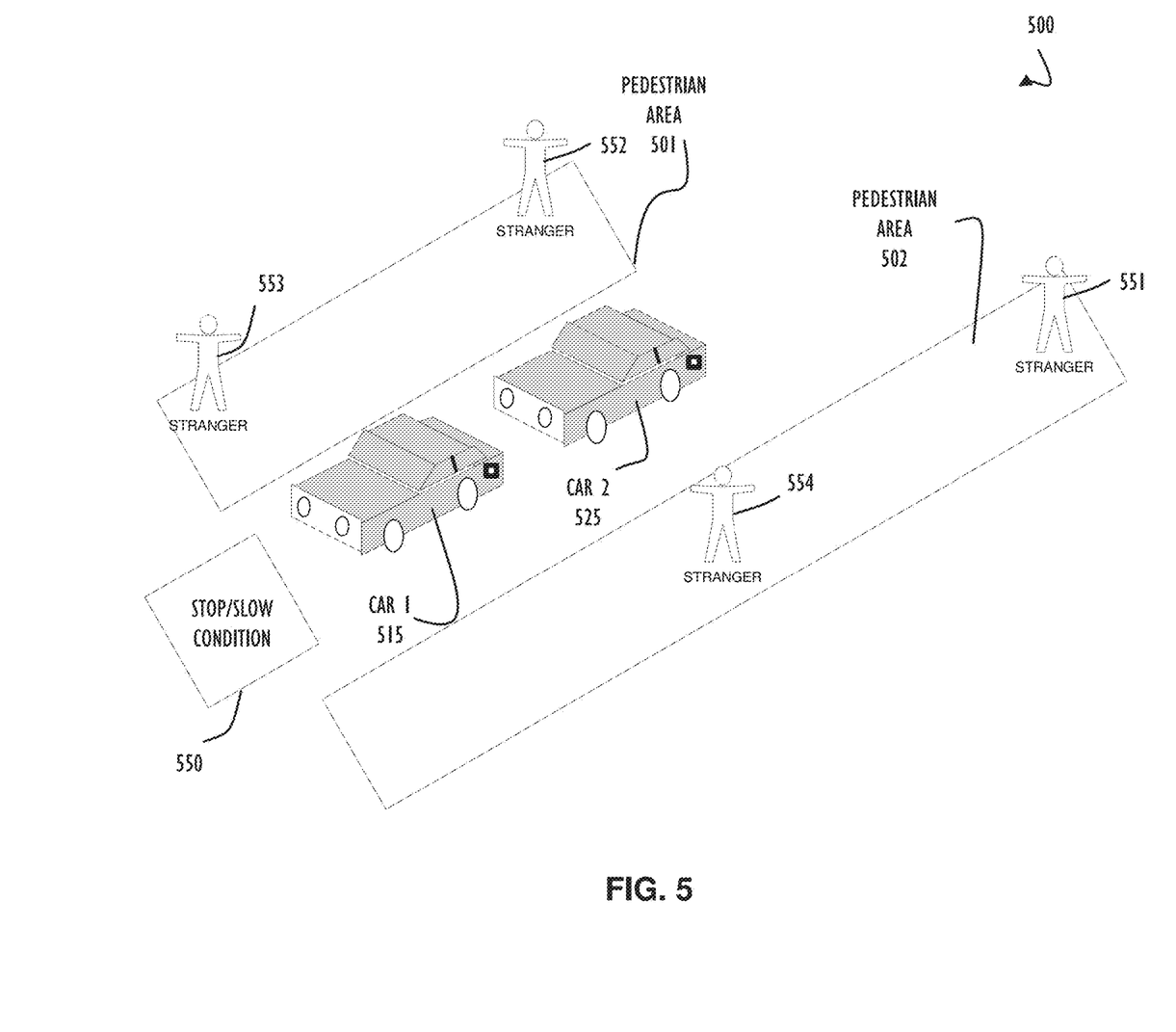
FIG. 5 illustrates a second example environment (e.g., a stop or slow condition) with foot traffic (pedestrians) where the disclosed vehicle security system may be beneficial, according to one or more disclosed implementations.

Referring now to FIG. 5 FIG. 5 a second example environment 500 is illustrated. Environment 500 depicts a stop (e.g., stop light) or slow condition (e.g., traffic and/or construction area) with foot traffic where the disclosed vehicle security system may be beneficial, according to one or more disclosed implementations. In environment 500 there is a first pedestrian area 501 and a second pedestrian area 502 on either side of traffic flow and stranger 551, stranger 552, stranger 553, and stranger 554 are at different locations within respective pedestrian areas.

In example environment 500 it is expected that each of first car 515 and second car 525 are occupied by at least a driver. However, the windows of the car may be in a down state and personal belongings (purse, computer, parcel, etc.) may be within reach of a stranger through an open window. If a stranger were to simply reach into a car and grab an object, that stranger (now a thief) could run away with the stolen item. The driver, being at the stop condition, may not be aware of the stranger reaching into the car or may not be able to react regarding the theft (e.g., because they are stuck in their car). In such situations, the disclosed vehicle security system may issue an alert to notify the driver of any security breach and an audible alert may inform other strangers (that may be good Samaritans) to act regarding the theft.

Figure 6:
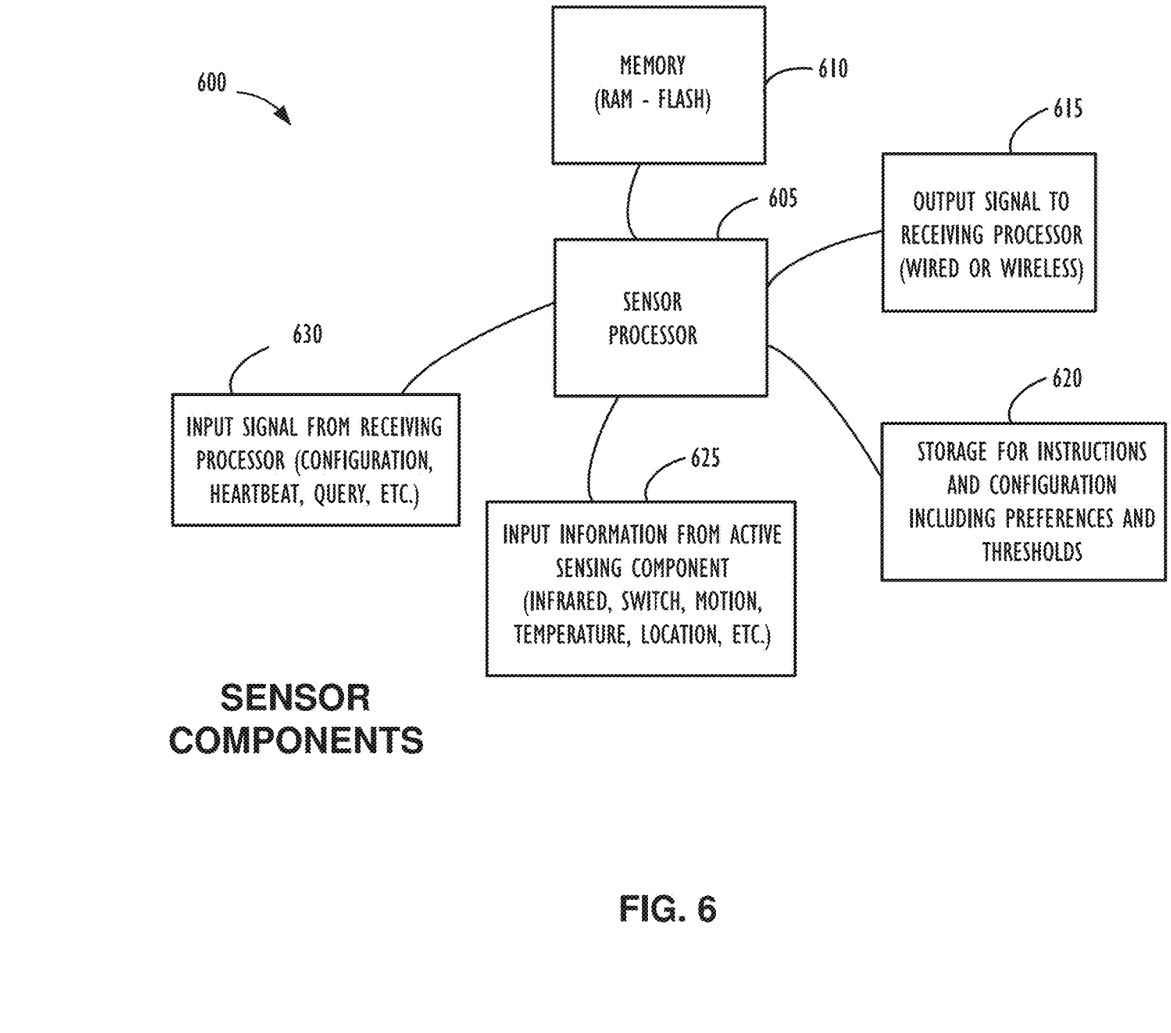
FIG. 6 illustrates a block diagram explaining possible components of different types of sensors (e.g., thermal, switch, infrared, motion) that may be used to support a vehicle security system, according to one or more disclosed implementations.

FIG. 6 illustrates a sensor device 600 that may be used to implement or be used with the functions, modules, processing platforms, execution platforms, communication devices, and other methods and processes of this disclosure. For example, sensor device 600 illustrated in FIG. 6 could represent a sensor of different types. Sensors may include a processing function or may be as simple as a switch that detects an electrical connection. In cases where a sensor performs a processing function, some or all of the components illustrated in FIG. 6 may be included within that sensor. Examples of sensor types that may include a processing function are thermal (heat, cold, or change in temperature) sensors, motion sensors, proximity monitors, light sensors, and different combinations thereof. In general, a sensor monitors for a change in condition or environmental metric and reports on what has been detected (i.e., sensed). Again, sensors may be of different types and are usually named based on a type of detection (e.g., the environmental metric being monitored) performed. This disclosure does not provide, or intend to provide, an exhaustive list of sensor types. Accordingly, sensor types not specifically mentioned herein may be included in some implementations of a vehicle security system without departing from the scope of this disclosure.

As shown in FIG. 6, sensor device 600 may include one or more sensor processors 605 that may be similar to a digital processor as discussed below with reference to FIG. 9. Specifically, sensor device 600 may include any of the components listed below for FIG. 9. Block 610 indicates that a sensor may include internal memory for storing processing instructions or configuration parameters (also shown as separately stored at block 620) as discussed throughout this disclosure. Block 615 indicates that sensor processor 605 may provide an output signal to indicate information detected or obtained (e.g., via processing) at that sensor. The output signal may be provided to a receiving processor (e.g., a central control processor of a vehicle security system). The output signal may be transmitted via a wired or wireless connection. The connection may, in some cases, be a network connection such as a computer network or a component device network. Different types of in-vehicle networks exist (e.g., local interconnect network ("LIN"), controller area network ("CAN"), media oriented systems transport ("MOST")) that may be used instead of or in combination with computer based networks described herein.

Block 625 indicates that sensor processor 605 may receive input information from active sensing components (e.g., components measuring environmental factors) of different types of sensors as discussed herein. Block 630 indicates that sensor processor 605 may also receive information from other processors, for example, a central control processor of a vehicle security system or another "upstream" processor. Specifically, multiple sensors may be connected to each other in a chain such that they collectively (e.g., serially) provide information to further "downstream" processors (e.g., receiving processor as shown in block 615).

Figure 7:
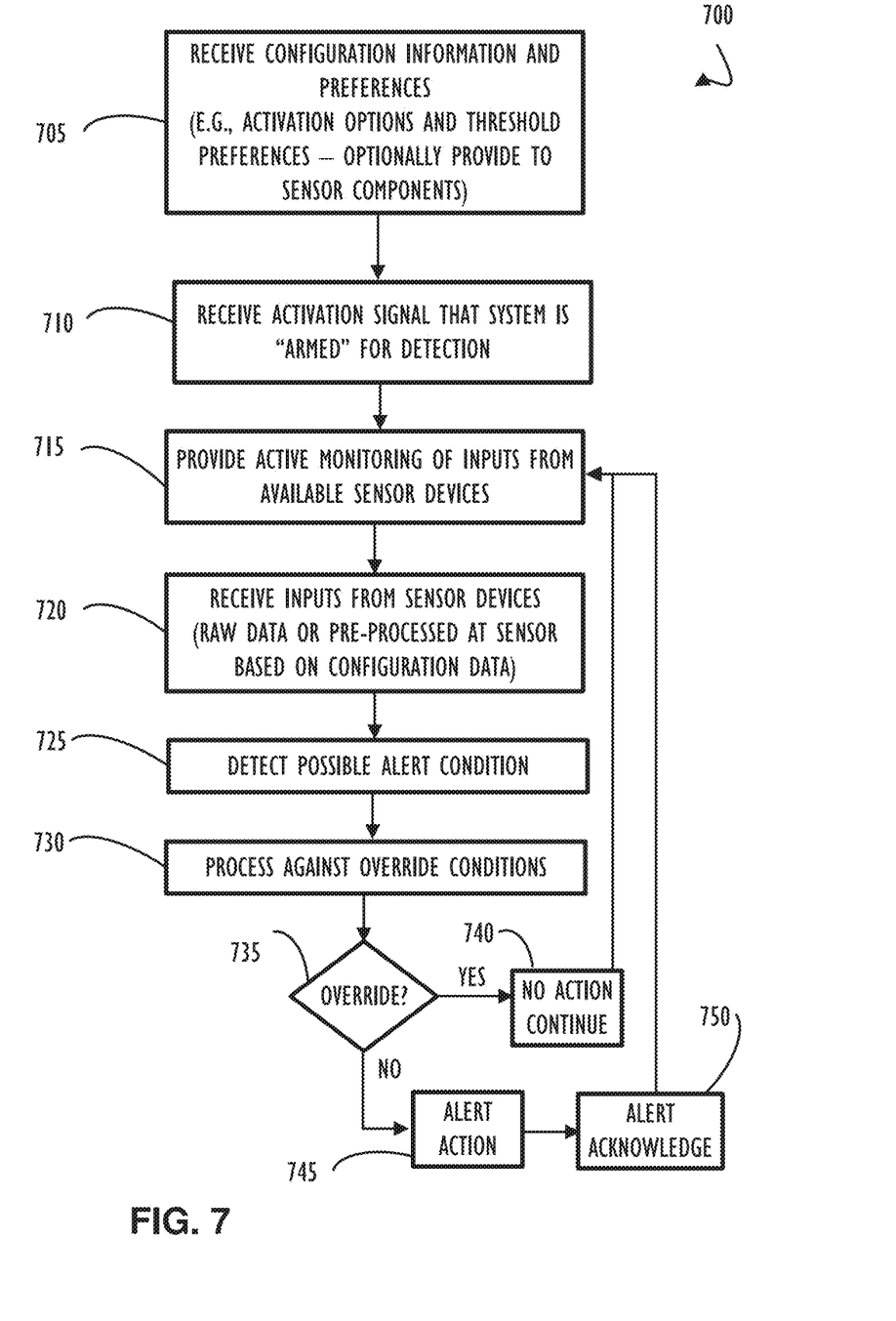
FIG. 7 illustrates an example method of operation (e.g., process flow) for different components of the disclosed vehicle security system operating collectively, according to one or more disclosed implementations.

FIG. 7 is a flow chart depicting an example method (700) of performing processing flow to implement a vehicle security system (or use thereof). At block 705 a vehicle security system may be configured to function based on user preferences or operating parameters (e.g., alert thresholds) to configure that vehicle security system for a particular vehicle. The configuration parameters may configure the system as a whole or may be intended to determine functionality of a specific component of the entire system (e.g., a particular sensor or sensor type may receive configuration information). In some cases, a configuration parameter may affect the functionality of a particular sensor in combination with affecting actions of a central control processor. Many combinations are possible. In general, configuration parameters represent a "fine tuning" of a vehicle security system to operate in accordance with desires of a user or user environment (e.g., fleet vehicles may be configured based on corporate requirements as opposed to personal preferences).

Block 710 indicates that, once configured, a vehicle security system may receive an indication to become active and begin monitoring. This action is commonly referred to as "arming" the security system. Block 715 indicates that the vehicle security system may begin active monitoring and perform functions, based on its configuration, to receive inputs (e.g., in the form of data or measured metrics) from all available sensors and process that information at each individual sensor and possibly a central control processor. Specifically, each individual sensor may first process information and determine if data should be forwarded to a central control processor for further processing. Alternatively, in some implementations, sensors of a particular type (e.g., a switch), or having a specific configuration, may not perform initial processing of data and may be implemented to simply send information to other components of the vehicle security system for processing.

Block 720 indicates that data may be received (e.g., as the above-mentioned data inputs) from one or more sensor devices. Block 725 indicates that processing may be performed (e.g., at a central control processor) to determine if an alert condition exists. Block 730 indicates that an alert condition may be checked against potential override conditions (e.g., suppression preferences) to determine if the alert action requires invocation of an alarm function. Decision 735 determines if an override is to be honored. If so, the YES prong of decision 735, flow continues to block 740 where no alarm function is invoked. Flow then returns to block 715 to continue monitoring. However, if the override is not to be honored (or not in place), the NO prong of decision 735, flow continues to block 745 where an alert action (e.g., horn activation, alert to cell phone, etc.) may be initiated. The alert action may be a single action, a repetitive action, or a combination of different actions. Block 750 indicates that an alert acknowledge may be provided. The acknowledge may be received from a user or may simply be a time-out function. In any case, once an alert action is terminated via acknowledgement, flow returns to block 715 to continue monitoring.

Figure 8:
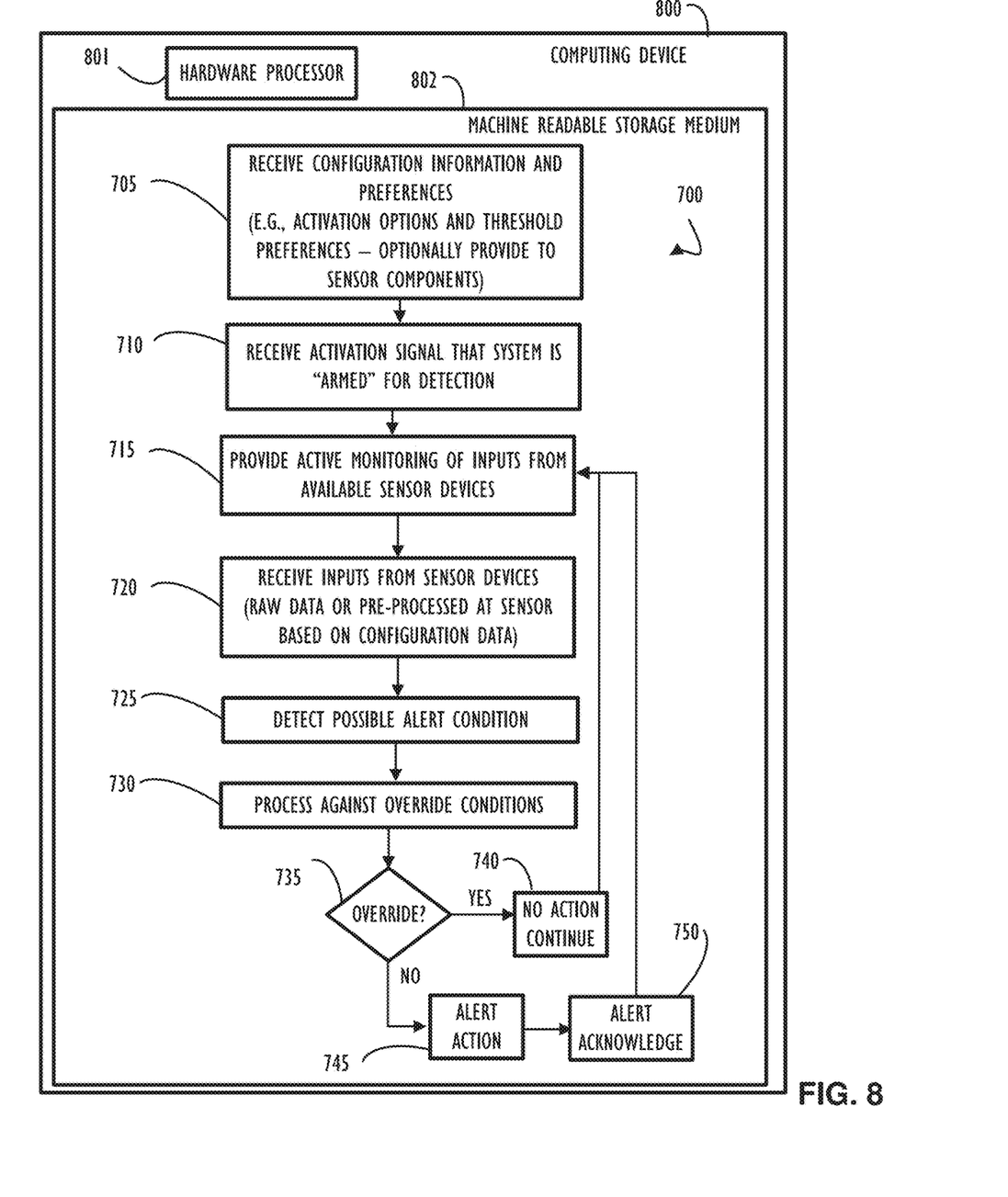
FIG. 8 illustrates an example computing device (e.g., computer processor, control processor, enhanced sensor) including executable computer instructions that may be used to implement different aspects of a vehicle security system, according to one or more disclosed implementations.

Referring now to FIG. 8, shown is an example computing device 800, with a hardware processor 801, and accessible machine-readable instructions stored on a machine-readable medium 802 that may be used to implement a vehicle security system, according to one or more disclosed example implementations. FIG. 8 illustrates computing device 800 configured to perform the flow of method 700 as an example. However, computing device 800 may also be configured to perform the flow of other methods, techniques, functions, or processes described in this disclosure. In this example of FIG. 8, machine-readable storage medium 802 includes instructions to cause hardware processor 801 to perform blocks 705-750 discussed above with reference to FIG. 7.

A machine-readable storage medium, such as 802 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 9:
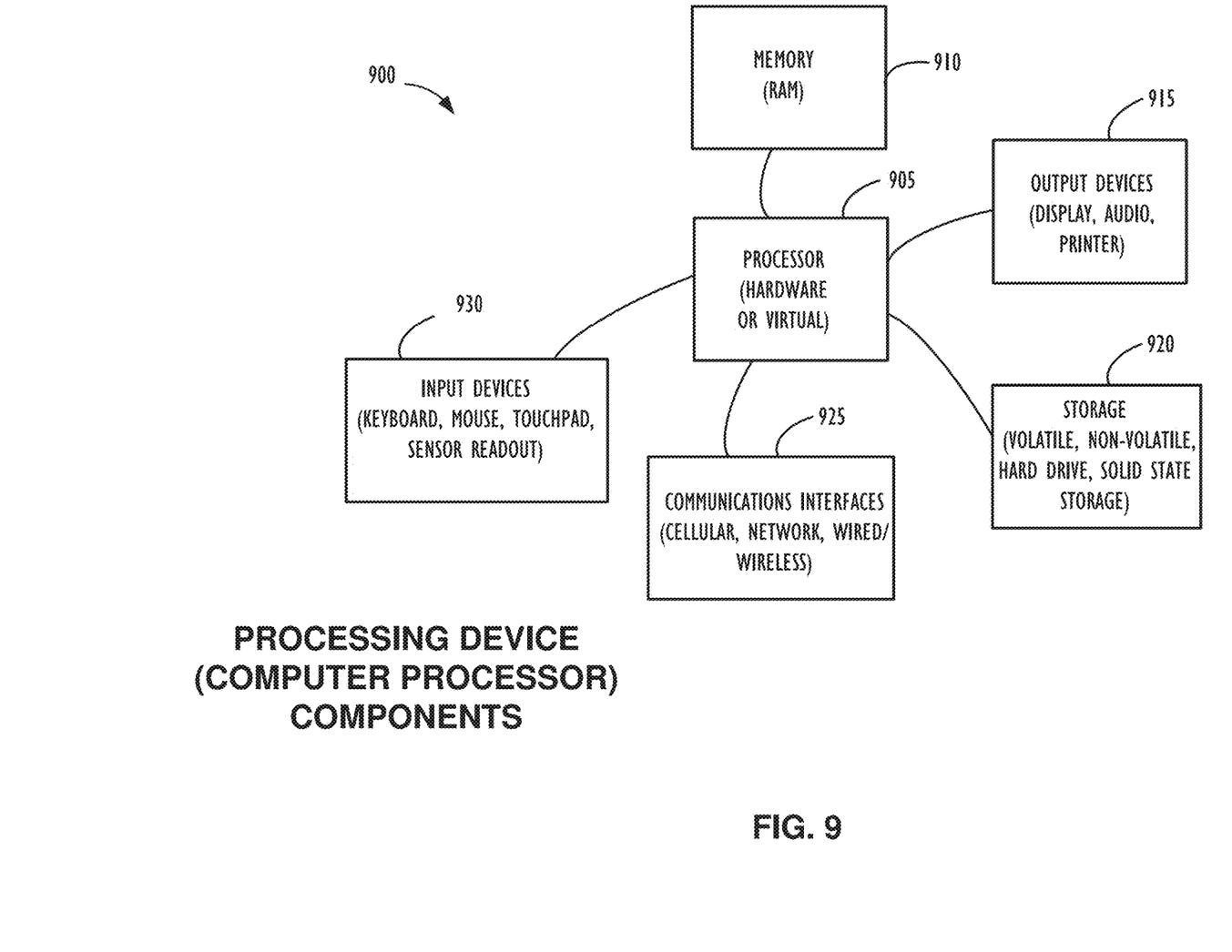
FIG. 9 illustrates an example processing device (e.g., computer processor) and components thereof that may work collectively to provide functionality of a specifically configured capability to implement a vehicle security system, methods, and other techniques of this disclosure, according to one or more disclosed implementations.

FIG. 9 illustrates a computing device 900 that may be used to implement or be used with the functions, modules, processing platforms, execution platforms, communication devices, and other methods and processes of this disclosure. For example, computing device 900 illustrated in FIG. 9 could represent a client device or a physical server device and include either hardware or virtual processor(s) depending on the level of abstraction of the computing device. In some instances (without abstraction), computing device 900 and its elements, as shown in FIG. 9, each relate to physical hardware. Alternatively, in some instances one, more, or all of the elements could be implemented using emulators or virtual machines as levels of abstraction. In any case, no matter how many levels of abstraction away from the physical hardware, computing device 900 at its lowest level may be implemented on physical hardware.

As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display).

Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, Bluetooth®, power line communication ("PLC"), WiFi®, cellular, and/or other communication methods.

As illustrated in FIG. 9, computing device 900 includes a processing element such as processor 905 that contains one or more hardware processors, where each hardware processor may have a single or multiple processor core. 9 Although not illustrated in FIG. 9, the processing elements that make up processor 905 may also include one or more of other types of hardware processing components, such as graphics processing units ("GPU"), application specific integrated circuits ("ASICs"), field-programmable gate arrays ("FPGAs"), and/or digital signal processors ("DSPs").

FIG. 9 illustrates that memory 910 may be operatively and communicatively coupled to processor 905. Memory 910 may be a non-transitory medium configured to store various types of data. For example, memory 910 may include one or more storage devices 920 that comprise a non-volatile storage device and/or volatile memory. Volatile memory, such as random-access memory ("RAM"), can be any suitable non-permanent storage device. The non-volatile storage devices 920 can include one or more disk drives, optical drives, solid-state drives ("SSDs"), tap drives, flash memory, read only memory ("ROM"), and/or any other type of memory designed to maintain data for a duration of time after a power loss or shut down operation. In certain instances, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one implementation, the compiling process of the software program may transform program code written in a programming language to another computer language such that the processor 905 is able to execute the programming code. After the compiling process, the encoded instructions may then be loaded as computer executable instructions or process steps to processor 905 from storage device 920, from memory 910, and/or embedded within processor 905 (e.g., via a cache or on-board ROM). In some cases, software may be stored persistently on a storage device as firmware. Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905.

Various parts of the method 700 may be repeated as needed. One or more portions of the method may be performed simultaneously or in any order as needed for a particular implementation out of many possible functional implementations.

While the embodiments are described with reference to various implementations and exploitations, it will be understood that these embodiments are illustrative and that the scope of the inventive subject matter is not limited to specifically disclosed implementations. Many variations, modifications, additions and improvements are possible.

Plural instances may be provided for components, operations, or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component couples to a second component, that coupling may be through a direct connection or through an indirect connection via other components and connections. In this disclosure a direct connection will be referenced as a "connection" rather than a coupling. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A vehicle security system for a vehicle, the vehicle security system comprising:
  a plurality of sensors to perform detection of events or changes in environmental conditions, the plurality of sensors including a gas tank lid sensor to detect a first operation to initiate refueling and a second operation to terminate refueling;
  a central monitor including a computer processor communicatively coupled to each of the plurality of sensors;
  at least one car component communicatively coupled to the central monitor and associated with a control output of the central monitor; and
  an instruction storage area accessible by the computer processor of the central monitor, the instruction storage area having executable instructions stored therein, that when executed by the computer processor, cause the central monitor to:
    process an arming request to activate security monitoring, the arming request initiated based on the first operation;
    determine an occupancy state of the vehicle;
    obtain inputs from at least a subset of the plurality of sensors;
    perform monitoring to detect a reach in threat by monitoring a plane formed by an open window to determine if the plane is broken by the reach in threat;
    determine an alert condition based on processing the obtained inputs against pre-configured threshold settings associated with each of the obtained inputs, wherein the processing to determine the alert condition is based on the occupancy state; and
    provide the control output to the at least one car component to cause the at least one car component to perform an action.

2. The vehicle security system of claim 1, wherein the executable instructions further comprise instructions to cause the central monitor to:
  monitor activity in an area surrounding the vehicle using proximity detection sensors to determine if unidentified movement approaches vehicle; and
  initiate an alarm based on the unidentified movement encroaching a pre-defined threshold proximity distance.

3. The vehicle security system of claim 2, wherein the instructions to monitor activity in area surrounding vehicle include instructions to track movement of an occupant performing refueling and suppress that movement with respect to alarm initiation.

4. The vehicle security system of claim 3, wherein the occupant performing refueling exits the vehicle from a passenger door of the vehicle.

5. The vehicle security system of claim 3, wherein the occupant performing refueling exits the vehicle from a driver door of the vehicle.

6. The vehicle security system of claim 1, wherein the instructions to determine the occupancy state of the vehicle further comprise instructions to cause the central monitor to:
  detect a passenger in addition to a driver is within the vehicle using image processing analysis of images obtained from an interior of the vehicle at a time of the arming request.

7. The vehicle security system of claim 1, wherein the executable instructions further comprise instructions to cause the central monitor to:
  determine that at least one window of the vehicle is in an open state; and
  initiate closing of the at least one window to a cracked state.

8. The vehicle security system of claim 1, wherein the executable instructions further comprise instructions to cause the central monitor to:
  determine that at least one door of the vehicle on a blind side of the vehicle is unlocked; and
  initiate the control output to initiate a locking action to lock the at least one door.

9. The vehicle security system of claim 1, wherein the executable instructions further comprise instructions to cause the central monitor to:
  perform monitoring to detect a reach in threat by monitoring a plane formed by an open window is broken by the reach in threat.

10. The vehicle security system of claim 9, wherein the executable instructions further comprise instructions to cause the central monitor to:
  initiate an alarm notification based on detection of the reach in threat.

11. The vehicle security system of claim 10, wherein the executable instructions to initiate an alarm notification further comprise instructions to cause the central monitor to:
  initiate transmission of information to a cell phone application for a pre-defined cell phone number.

12. The vehicle security system of claim 10, wherein the executable instructions to initiate an alarm notification further comprise instructions to cause the central monitor to:
  initiate, via the control output, activation of a horn of the vehicle or lights of the vehicle.

13. The vehicle security system of claim 1, wherein the arming request is initiated based on an opening of a gas tank lid for the vehicle and the executable instructions further comprise instructions to cause the central monitor to:
  detect the second operation to terminate refueling to initiate deactivation of security monitoring.

14. The vehicle security system of claim 13, further comprise instructions to cause the central monitor to:
  perform a pre-determined time period delay after the detected second operation prior to the initiating deactivation of security monitoring.

15. The vehicle security system of claim 1, further comprise instructions to cause the central monitor to:
  determine an initial open state for each window of the vehicle at time of activation of security monitoring;
  automatically initiate a close control output for windows in an open state;
  automatically lock doors on a blind side of the vehicle; and
  process a deactivation of security monitoring that includes automatic initiation of an open control output to return each window of the vehicle to the initial open state.

16. The vehicle security system of claim 1, wherein the initiate refueling includes at least one of: opening a gas tank lid; unlocking a gas tank lid; removal of a gas cap; and insertion of a nozzle; and
  wherein the terminate refueling includes at least one of: closing the gas tank lid; closing of the gas cap; and removal of the nozzle.

17. The vehicle security system of claim 1, wherein the instructions to determine the occupancy state of the vehicle further comprise instructions to cause the central monitor to:
  detect a child is within the vehicle.

18. The vehicle security system of claim 1, wherein the instructions to determine the occupancy state of the vehicle further comprise instructions to cause the central monitor to:

detect a person in addition to a driver is within the vehicle using an input from an airbag activation sensor.

19. A non-transitory computer readable medium having instructions stored thereon that when executed by a computer processor cause the computer processor to perform a vehicle security monitoring function for a vehicle, the security monitoring function including:

receiving inputs, at a central monitor, from a plurality of sensors configured to perform detection of events or changes in environmental conditions, the plurality of sensors including a gas tank lid sensor to detect a first operation to initiate refueling and a second operation to terminate refueling, the central monitor including a computer processor communicatively coupled to each of the plurality of sensors and coupled to at least one car component associated with a control output of the central monitor, wherein the security monitoring function comprises instructions to cause the central monitor to:

process an arming request to activate security monitoring, the arming request initiated based on the first operation;

determine an occupancy state of the vehicle;

obtain inputs from at least a subset of the plurality of sensors;

perform monitoring to detect a reach in threat by monitoring a plane formed by an open window to determine if the plane is broken by the reach in threat;

determine an alert condition based on processing the obtained inputs against pre-configured threshold settings associated with each of the obtained inputs, wherein the processing to determine the alert condition is based on the occupancy state; and provide the control output to the at least one car component to cause the at least one car component to perform an action.

20. The non-transitory computer readable medium of claim 19, wherein the executable instructions further comprise instructions to cause the central monitor to:

monitor activity in area surrounding vehicle using proximity detection sensors to determine if unidentified movement approaches vehicle; and initiate an alarm based on the unidentified movement encroaching a pre-defined threshold proximity distance.

* * * * *